United States Patent
Park et al.

(10) Patent No.: US 9,112,202 B2
(45) Date of Patent: Aug. 18, 2015

(54) BATTERY MODULE

(75) Inventors: Seong-Joon Park, Yongin-si (KR); Ri-A Ju, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 24 days.

(21) Appl. No.: 13/607,043

(22) Filed: Sep. 7, 2012

(65) Prior Publication Data

US 2013/0252045 A1 Sep. 26, 2013

(30) Foreign Application Priority Data

Mar. 23, 2012 (KR) .................. 10-2012-0030233

(51) Int. Cl.
*H01M 2/10* (2006.01)
*H01M 2/12* (2006.01)
*H01M 2/14* (2006.01)
*H01M 10/0525* (2010.01)

(52) U.S. Cl.
CPC .......... *H01M 2/1016* (2013.01); *H01M 2/1264* (2013.01); *H01M 2/14* (2013.01); *H01M 10/0525* (2013.01)

(58) Field of Classification Search
None
See application file for complete search history.

(56) References Cited

U.S. PATENT DOCUMENTS

| 2008/0160395 | A1 | 7/2008 | Okada et al. |
| 2010/0190050 | A1 | 7/2010 | Ochi |
| 2010/0310909 | A1 | 12/2010 | Yun et al. |
| 2011/0262799 | A1* | 10/2011 | Kim .............................. 429/156 |
| 2011/0287299 | A1 | 11/2011 | Kim |
| 2012/0003526 | A1* | 1/2012 | Kume et al. ................... 429/151 |
| 2012/0282516 | A1* | 11/2012 | Kim .............................. 429/159 |

FOREIGN PATENT DOCUMENTS

| JP | 2008-166191 | 7/2008 |
| JP | 2009-187781 | 8/2009 |
| JP | 2009187781 A * | 8/2009 |
| JP | 2010-176997 | 8/2010 |
| JP | 2010-186681 | 8/2010 |
| KR | 10-2009-0043429 | 5/2009 |
| KR | 10-2011-0128593 | 11/2011 |

OTHER PUBLICATIONS

Full English Machine Translation of JP 2009-187781, 18 pages.
Full English Machine Translation of JP 2010-186681, 21 pages.

(Continued)

*Primary Examiner* — Patrick Ryan
*Assistant Examiner* — Haixia Zhang
(74) *Attorney, Agent, or Firm* — Christie, Parker & Hale, LLP (57) ABSTRACT

A battery module includes a first unit cell arranged parallel to a second unit cell and a spacer arranged between the first and second unit cell. Each of the first and second unit cells includes a first electrode terminal and a second electrode terminal having a polarity opposite to that of the first electrode terminal. The spacer includes a main body and a first wall portion extending upward from the main body, and the first wall portion is disposed at and between the first electrode terminal of the first unit cell and the second electrode terminal of the second unit cell. The first electrode terminal of the first unit cell is juxtaposed to the second electrode terminal of the second unit cell.

19 Claims, 6 Drawing Sheets (56) References Cited

OTHER PUBLICATIONS

KIPO Office action dated Mar. 29, 2013 for priority application No. 10-2012-0030233 (3 pages).

KIPO Notice of Allowance dated Sep. 5, 2013, for Korean priority Patent application 10-2012-0030233, (6 pages).

* cited by examiner

BATTERY MODULE

CROSS-REFERENCE TO RELATED APPLICATION

This application claims priority to and the benefit of Korean Patent Application No. 10-2012-0030233, filed on Mar. 23, 2012, in the Korean Intellectual Property Office, the disclosure of which is incorporated herein in its entirety by reference.

BACKGROUND

1. Field

One or more embodiments of the present invention relate to a battery module.

2. Description of the Related Art

In general, secondary cells are chargeable and dischargeable unlike primary cells that are not chargeable (or not rechargeable). A secondary cell may be used in the form of a single cell or in the form of a cell module in which a plurality of unit cells are connected in one unit, according to the external apparatus to which the secondary cell is applied (e.g., powering).

The unit cells included in a cell module are electrically connected by using a plurality of bus bars. The bus bars are provided with insulation. To this end, conventionally, a separate structure (housing) is added to a cell module to secure the insulation between the neighboring bus bars. Also, the unit cells discharge gas that is internally generated. Conventionally, a separate apparatus is further provided to discharge the gas out of the cell module. Accordingly, the weight of the cell module is increased and a manufacturing process of the cell module becomes complicated, and thus, manufacturing efficiency may be degraded.

SUMMARY

One or more embodiments of the present invention are directed toward a battery module that may enhance an insulation characteristic between unit cells arranged along a line and omit a separate structure for discharging gas generated in the unit cells.

Additional aspects will be set forth in part in the description which follows and, in part, will be apparent from the description, or may be learned by practice of the presented embodiments.

According to one or more embodiments of the present invention, a battery module includes: a first unit cell arranged parallel to a second unit cell, each of the first and second unit cells including a first electrode terminal and a second electrode terminal having a polarity opposite to that of the first electrode terminal; and a spacer arranged between the first and second unit cells. The spacer includes a main body and a first wall portion extending upward from the main body, and the first wall portion is disposed at and between the first electrode terminal of the first unit cell and the second electrode terminal of the second unit cell, the first electrode terminal of the first unit cell being juxtaposed to the second electrode terminal of the second unit cell.

In one embodiment, the spacer includes an upper surface, a lower surface, a first side surface, and a second side surface symmetrically protruding from a front surface and a rear surface of the main body to surround parts of the first and second unit cells; and the first wall portion is disposed on the upper surface of the spacer.

In one embodiment, the spacer includes an electrode terminal exposure portion exposing the first and second electrode terminals respectively included in the first and second unit cells to the outside, the electrode terminal exposure portion being formed on the upper surface.

In one embodiment, the first and second side surfaces extend upward to the same height as the first wall portion. The first wall portion may be perpendicular to the first side surface, and one end of the first wall portion may contact the first side surface. The spacer may include a second wall portion parallel to the first side surface and contacting another end of the first wall portion, and a third wall portion parallel to the second side surface and separated by as much as a length of the first wall portion from the second side surface. The second and third wall portions may be formed on the upper surface of the spacer.

In one embodiment, each of the first and second unit cells includes a vent member formed on an upper portion thereof, and the spacer includes a vent member exposure portion exposing the vent member, the vent member exposure portion being formed on the upper surface of the spacer. The spacer may include an air exhaust passage member covering the vent member exposure portion, the air exhaust passage member being formed on the upper surface of the spacer. The air exhaust passage member may include a coupling member at one end thereof.

In one embodiment, a hole is formed in each of the first side surface, the second side surface, and the lower surface.

In one embodiment, a plurality of protrusions are formed on a front surface and a rear surface of the main body.

In one embodiment, the second electrode terminal of the first unit cell and the first electrode terminal of the second unit cell are connected by a bus bar.

In one embodiment, the main body is integrally provided with the first wall portion.

According to one or more embodiments of the present invention, a battery module includes: a plurality of unit cells alternately arranged such that locations of first and second electrode terminals of one of the unit cells are juxtaposed to second and first electrode terminals of a neighboring one of the unit cells in a thicknesswise direction of the unit cells; a plurality of spacers arranged between the plurality of unit cells; and a plurality of bus bars electrically connecting the plurality of unit cells. Each of the plurality of spacers includes a main body and a first wall portion extending upward from the main body, the first wall portion being disposed between two neighboring bus bars of the plurality of bus bars, and the plurality of spacers are alternately arranged to form independent bus bar space.

In one embodiment, each of the plurality of spacers includes an upper surface, a lower surface, a first side surface, and a second side surface symmetrically protruding from a front surface and a rear surface of the main body, the first wall portion is disposed on the upper surface of the spacer, and the first and second side surfaces extend upward to the same height as the first wall portion, and one end of the first wall portion contacts the first side surface.

In one embodiment, each of the plurality of spacers includes: a second wall portion parallel to the first side surface and contacting another end of the first wall portion; and a third wall portion parallel to the second side surface and separated by as much as a length of the first wall portion from the second side surface, the second and third wall portions being formed on the upper surface of the corresponding spacer. The heights of the first side surface, the second side surface, the first wall portion, the second wall portion, and the third wall portion may be higher than the heights of the first and second electrode terminals.

In one embodiment, each of the plurality of spacers includes: a vent member exposure portion; and an air exhaust passage member covering the vent member exposure portion, the vent member exposure portion and the air exhaust passage member being formed on the upper surface of the corresponding spacer. The air exhaust passage members of the plurality of spacers may be connected to one another to form an air exhaust pipe.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

In the present specification, each constituent element may be formed "directly" "on" or "under" another constituent element or "indirectly" "on" or "under" the other constituent element with one or more further constituent elements interposed therebetween. The status of "on" or "under" of a constituent element is described based on the drawings. In the drawings, each constituent element is exaggerated, omitted, or schematically illustrated for convenience of explanation and clarity.

Figure 1:
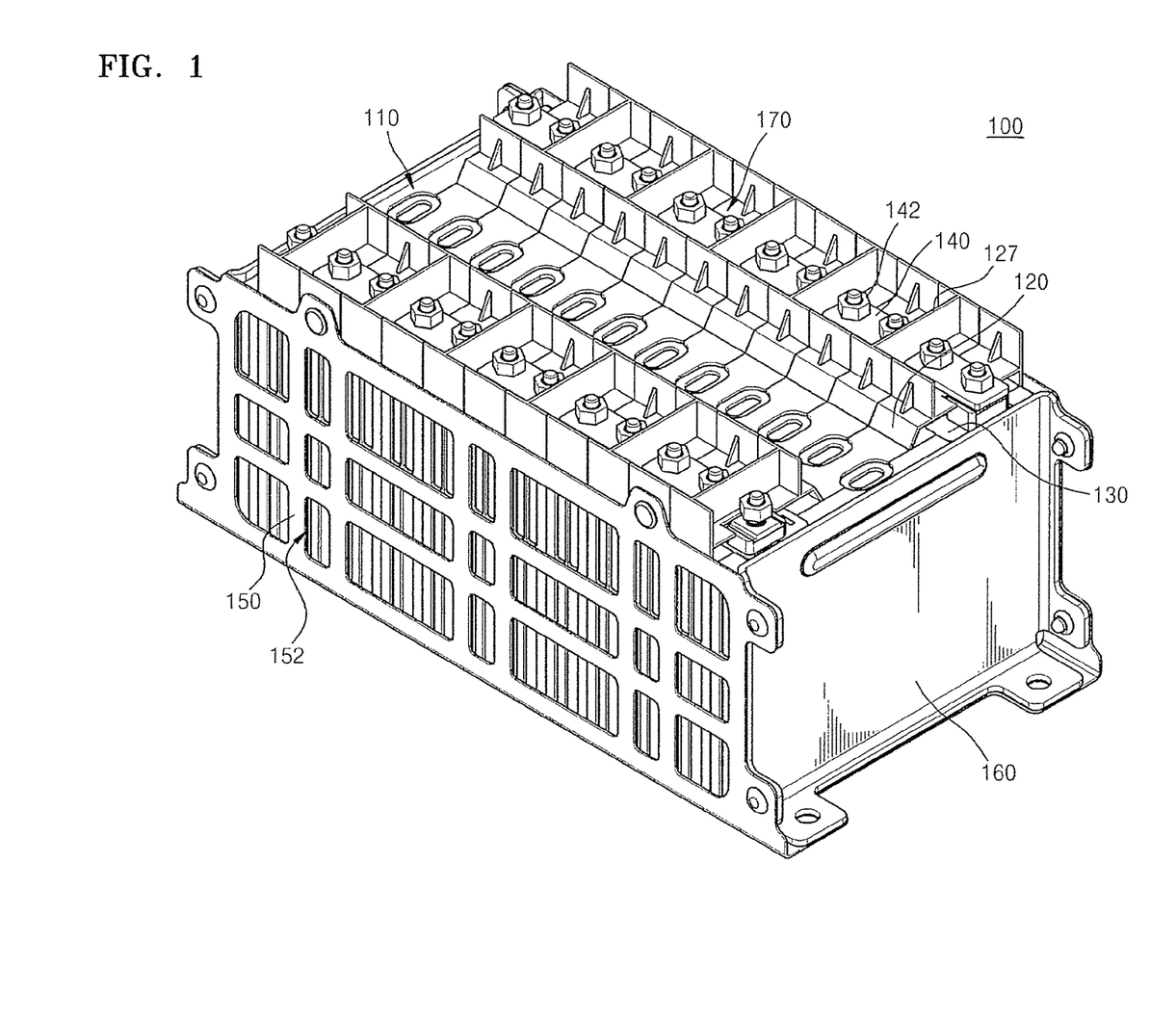
FIG. 1 is a perspective view illustrating a battery module according to an embodiment of the present invention.
Figure 2:
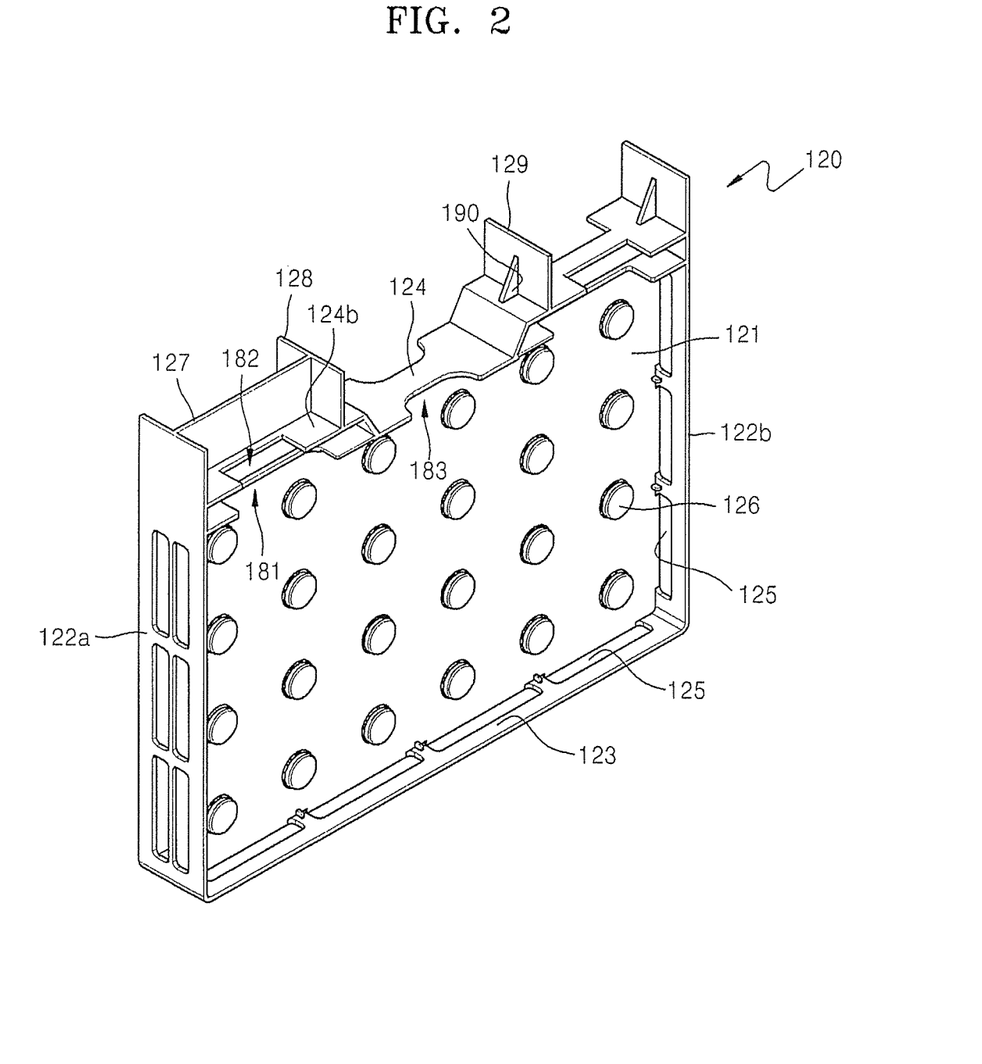
FIG. 2 is a perspective view illustrating a spacer of the battery module of FIG. 1.
Figure 3:
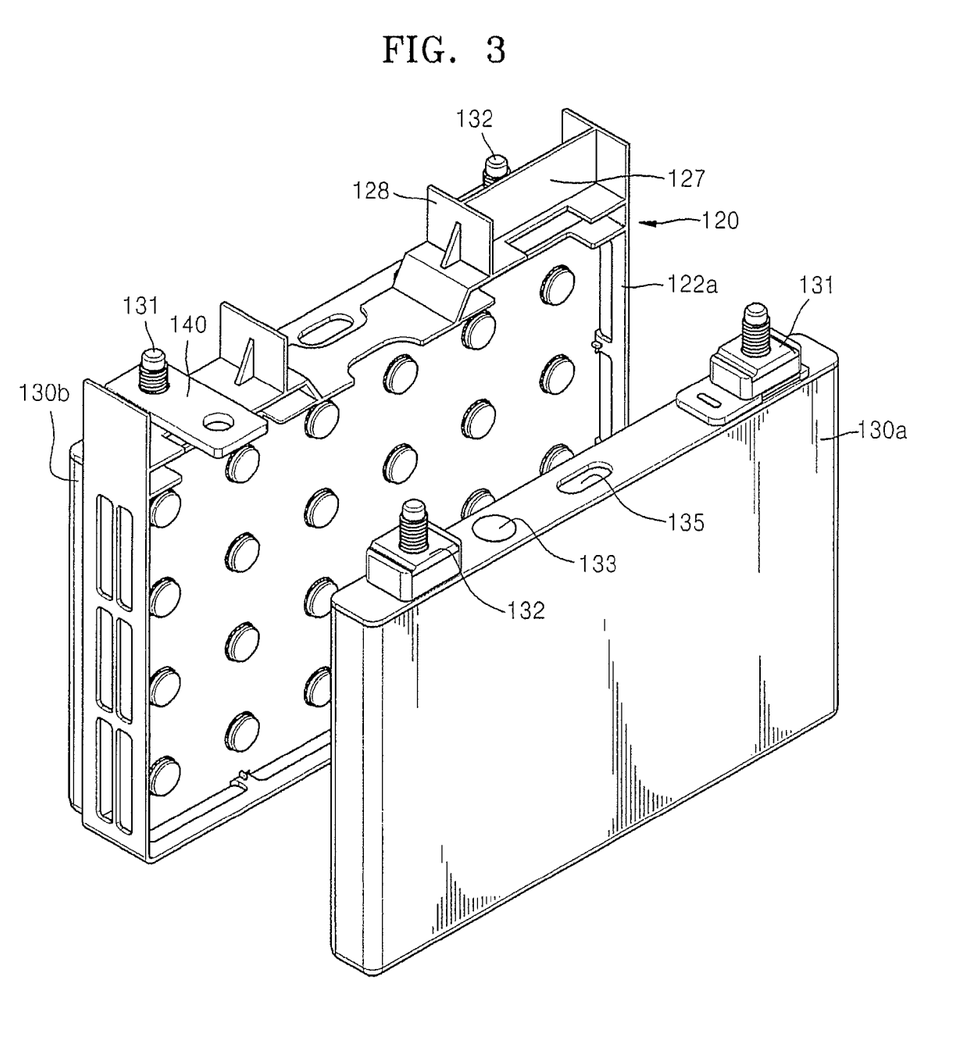
FIG. 3 is a perspective view illustrating a part of the battery module of FIG. 1.
Figure 4:
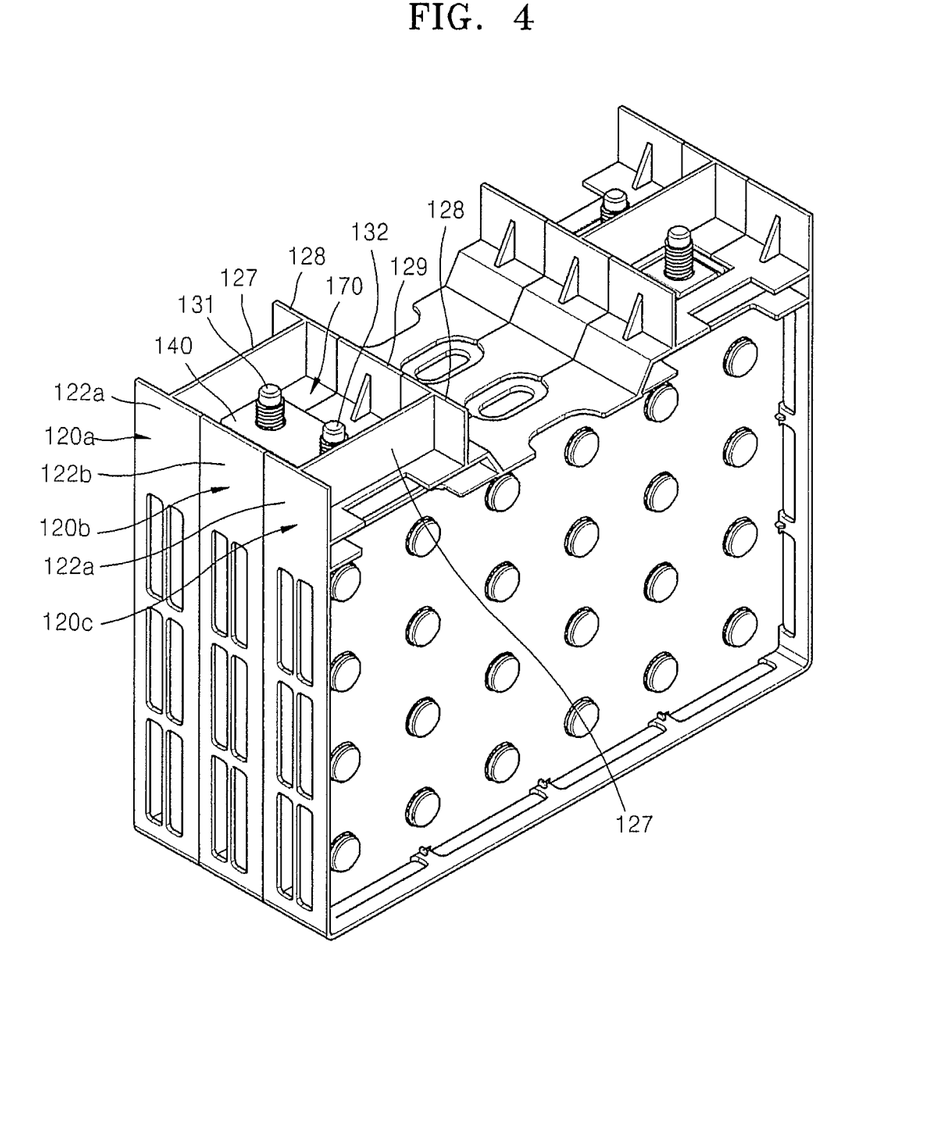
FIG. 4 is a perspective view illustrating another part of the battery module of FIG. 1.

FIG. 1 is a perspective view illustrating a battery module 100 according to an embodiment of the present invention. FIG. 2 is a perspective view illustrating one of a plurality of spacers 120 of the battery module 100 of FIG. 1. FIG. 3 is a perspective view illustrating a part of the battery module 100 of FIG. 1. FIG. 4 is a perspective view illustrating another part of the battery module 100 of FIG. 1.

Referring to FIGS. 1 to 4, the battery module 100 according to the present embodiment may include a battery part 110 for performing charge and discharge operations, and a battery case (not shown) housing the battery part 110 and giving the battery module 100 its outer appearance. The battery part 110 may include a plurality of unit cells 130, the spacers 120 disposed between the unit cells 130, and a plurality of bus bars 140 electrically connecting the unit cells 130.

Each of the unit cells 130 may be a secondary cell such as a lithium ion cell and have, for example, a substantially rectangular shape. Each of the unit cells 130 may include a first electrode terminal 131 and a second electrode terminal 132 having the opposite polarities. The first electrode terminal 131 and the second electrode terminal 132 are configured to be electrically connected to an external device to output power stored in each of the unit cells 130 to the outside or receive externally supplied power.

Each of the unit cells 130 may include, as a generation element, an electrode assembly (not shown) including a first electrode plate and a second electrode plate, and a separator interposed between the first and second electrode plates. The electrode assembly may be formed by interposing the separator between the first electrode plate that is a positive plate and the second electrode plate that is a negative plate and then wrapping and wiring the first and second electrode plates and the separator together into a form of a roll. For example, the first electrode terminal 131 is electrically connected to the first electrode plate and the second electrode terminal 132 is electrically connected to the second electrode plate. Each of the unit cells 130 may be charged and discharged through the first and second electrode terminals 131 and 132.

Also, an electrolyte injection hole for injecting electrolyte is formed in an upper portion of each of the unit cells 130. A seal cap 133 may be provided at the electrolyte injection hole. A vent member 135 may be formed to discharge gas generated in each of the unit cells 130 to the outside.

The unit cells 130 may be alternately arranged in a thicknesswise direction of the unit cells 130 such that first and second electrode terminals 131 and 132 of one of the unit cells 130 are arranged to be juxtaposed to (or arranged to face) second and first electrode terminals 132 and 131 of a neighboring one of the unit cells 130. The unit cells 130 may be electrically connected (e.g., in a serial manner) by the bus bars 140.

Each of the spacers 120 may be provided between the unit cells 130 that are arranged in a line. Each of the spacers 120 is disposed between the unit cells 130 and supports a side surface of each of the unit cells 130 so that an interval between the unit cells 130 may be maintained constant and thus air may pass therethrough. Each of the spacers 120, as illustrated in FIG. 2, may include a main body 121 and a first wall portion 127 provided with (e.g., integrally provided with) the main body 121 and extends upward therefrom.

Also, the spacer 120 may include an upper surface 124, a lower surface 123, a first side surface 122a, and a second side surface 122b which symmetrically protrude from a front surface and a rear surface of the main body 121. The first wall portion 127 is disposed on the upper surface 124.

A second wall portion 128 and a third wall portion 129 may be parallelly formed on the upper surface 124 (i.e., the second wall portion 128 is parallel to third wall portion 129). The second and third wall portions 128 and 129 may be supported by a support portion 190.

The first and second side surfaces 122a and 122b extend upward to a same height as the first wall portion 127. One end of the first wall portion 127 contacts the first side surface (first side wall) 122a. That is, the first wall portion 127 may be perpendicular to the first side surface 122a, and one end of the first wall portion 127 may contact the first side surface 122a. The other end of the first wall portion 127 contacts the second wall portion 128. The second wall portion 128 may be formed on the upper surface 124 parallel to the first side surface 122a.

The third wall portion 129 is formed on the upper surface 124 parallel to the second side surface (second side wall) 122b and separated from the second side surface 122b by as much as the length of the first wall portion 127. Therefore, since the first wall portion 127 is formed at only one side of the upper portion of each of the spacers 120, each of the spacers 120 may have an asymmetric shape in terms of their left and right sides.

FIG. 3 illustrates one spacer 120 and two unit cells 130. Referring to FIGS. 2 and 3, a first unit cell 130a and a second unit cell 130b are arranged at both sides of the spacer 120 such that the locations of the first and second electrode terminals 131 and 132 of the first unit cell 130a are juxtaposed to (or opposite to) to the second and first electrode terminals 132 and 131 of the second unit cell 130b in a thicknesswise direction of the first and second unit cells 130a and 130b. The first wall portion 127 included in the spacer 120 is disposed between the first electrode terminal 131 of the first unit cell 130a and the second electrode terminal 132 of the second unit cell 130b, the first electrode terminal 131 and the second electrode terminal 132 being arranged adjacent with (or juxtaposed with) each other.

On the other hand, the second electrode terminal 132 of the first unit cell 130a and the first electrode terminal 131 of the second unit cell 130b at a side where the first wall portion 127 is not formed are connected to each other by the bus bar 140. Thus, the spacer 120 according to the present embodiment may effectively prevent a short-circuit between the first and second electrode terminals 131 and 132 that are not connected by the same bus bar 140.

The upper surface 124, the lower surface 123, the first side surface 122a, and the second side surface 122b symmetrically protrude from the front and rear surfaces of the main body 121 of the spacer 120 to surround parts of the first and second unit cells 130a and 130b.

The main body 121 is a support surface supporting the first and second unit cells 130a and 130b. A plurality of protrusions 126 may be formed on the front and rear surfaces of the main body 121. The protrusions 126 may form an air passage by separating the main body 121 and the first and second unit cells 130a and 130b with a set or predetermined interval therebetween. Thus, heat generated from the first and second unit cells 130a and 130b or other constituent elements may be effectively discharged to the outside by the flow of air through the air passage.

The upper surface 124 protects the first and second unit cells 130a and 130b from the upper side thereof. An electrode terminal exposure portion 181 for exposing the first and second electrode terminals 131 and 132 respectively included in the first and second unit cells 130a and 130b may be formed in the upper surface 124.

Although FIG. 2 illustrates that the upper surface 124 includes a second upper surface 124b at opposite ends thereof, the present invention is not limited thereto. A second electrode terminal exposure portion 182 that is smaller than the first electrode terminal exposure portion 181 may be formed at the second upper surface 124b. The second electrode terminal exposure portion 182 may expose only a screw portion of the first unit cell 130a or the second unit cell 130b.

Also, a vent member exposure portion 183 for exposing the vent member 135 formed in the upper portion of each of the first and second unit cells 130a and 130b may be formed in the upper surface 124.

The lower surface 123 supports the first and second unit cells 130a and 130b from the lower side thereof. The first and second side surfaces 122a and 122b support and protect the first and second unit cells 130a and 130b from the lateral sides thereof. A plurality of holes 125 may be formed in the lower surface 123, the first side surface 122a, and the second side surface 122b. The holes 125 are inlets through which external air may flow so that the external air may pass through the air passage formed by the protrusions 126 of the main body 121.

FIG. 4 is a perspective view illustrating another part of the battery module 100 of FIG. 1. FIG. 4 illustrates two unit cells 130 (e.g., the unit cells 130a and 130b) and three spacers 120a, 120b, and 120c.

Referring to FIG. 4 together with FIGS. 1 and 2, the two unit cells 130 may be surrounded by the first spacer 120a, the second spacer 120b, and the third spacer 120c. The two unit cells 130 are arranged such that the first electrode terminal 131 of one unit cell 130 is juxtaposed to (or opposite to or facing or neighboring) the second electrode terminal 132 of the other unit cell 130 in a thicknesswise direction of the two unit cells 130. A pair of the neighboring first and second electrode terminals 131 and 132 are connected by the bus bar 140. The first wall portion 127 is disposed between the other pair of the neighboring first and second electrode terminals 131 and 132. Accordingly, the first wall portion 127 is disposed between the neighboring bus bars 140.

In more detail, as described above, each of the first to third spacers 120a to 120c may include the first wall portion 127 formed as a part of the main body 121 extending upward (e.g., the first wall portion 127 may extend upward from the main body 121 and/or may be integrally provided with the main body 121), and the upper surface 124, the lower surface 123, the first side surface 122a, and the second side surface 122b symmetrically protruding from the front and rear surface of the main body 121. Also, the second wall portion 128 and the third wall portion 129 may be formed on the upper surface 124 parallel to each other.

In addition, the first and second side surfaces 122a and 122b extend upward to the same height as the first wall portion 127. One end of the first wall portion 127 contacts the first side surface 122a, whereas the other end of the first wall portion 127 contacts the second wall portion 128. Since the third wall portion 129 is formed parallel to the second side surface 122b and separated by as much as a length of the first wall portion 127 from the second side surface 122b, the spacers 120a to 120c have an asymmetric shape in terms of their left and right sides.

The spacers 120a to 120c having the asymmetric shape in terms of their left and right sides are alternately arranged, thereby forming independent bus bar space 170. In other words, as illustrated in FIG. 4, one bus bar 140 is surrounded by the first side surfaces 122a and the first and second wall portions 127 and 128 of the first and third spacers 120a and 120c, and the second side surface 122b and the third wall portion 129 of the second spacer 120b so that the bus bar 140 may be disposed in one independent bus bar space 170. As a result, as illustrated in FIG. 1, each of the bus bars 140 is disposed in the bus bar space 170 that is independently divided by the spacers 120a to 120c that are alternately arranged so any short-circuit occurring between the neighboring bus bars 140 may be effectively prevented.

Also, since the heights of the first side surface 122a, the second side surface 122b, the first wall portion 127, the second wall portion 128, and the third wall portion 129, forming the bus bar space 170, are higher than those of the first and second electrode terminals 131 and 132, the first and second electrode terminals 131 and 132 connected to the bus bar 140 may not contact other elements except for the bus bar 140.

Thus, a conventional housing additionally provided to prevent any short-circuit between the neighboring bus bars 140 is omitted so that efficiency in manufacturing the battery module 100 may be enhanced, the weight of the battery module 100 may be reduced, and manufacturing costs may be reduced.

Referring back to FIG. 1, the bus bars 140 are extended across the upper sides of the unit cells 130 in a direction in which the unit cells 130 are arranged and thus electrically connect the first and second electrode terminals 131 and 132 of the unit cells 130. The unit cells 130 may be arranged in a pattern of alternating the first and second electrode terminals 131 and 132 as described above. Accordingly, the neighboring unit cells 130 may be serially connected by the bus bars 140 that extend in one direction.

After being coupled to the first and second electrode terminals 131 and 132 of the unit cells 130, the bus bar 140 may be fixed to corresponding screw portions formed on the first and second electrode terminals 131 and 132 of the unit cell 130 by a bolt 142. The unit cells 130 electrically connected by the bus bar 140 may be confined at four sides by a pair of side plates 150 and a pair of end plates 160 so that expansion of the unit cells 130 may be effectively restricted.

The side plates 150 support both sides of the unit cells 130 arranged in a thicknesswise direction of the unit cells (i.e., arranged along a line). The end plates 160 are coupled to the side plates 150 and vertically support the unit cells 130.

A plurality of cooling holes 152 may be formed in the side plates 150. External air may enter through the cooling holes 152, and the external air having passed through the cooling holes 152 may pass through the holes 125 formed in the spacers 120 to be input to the air passage formed by the protrusions 126 of the main body 121.

Figure 5:
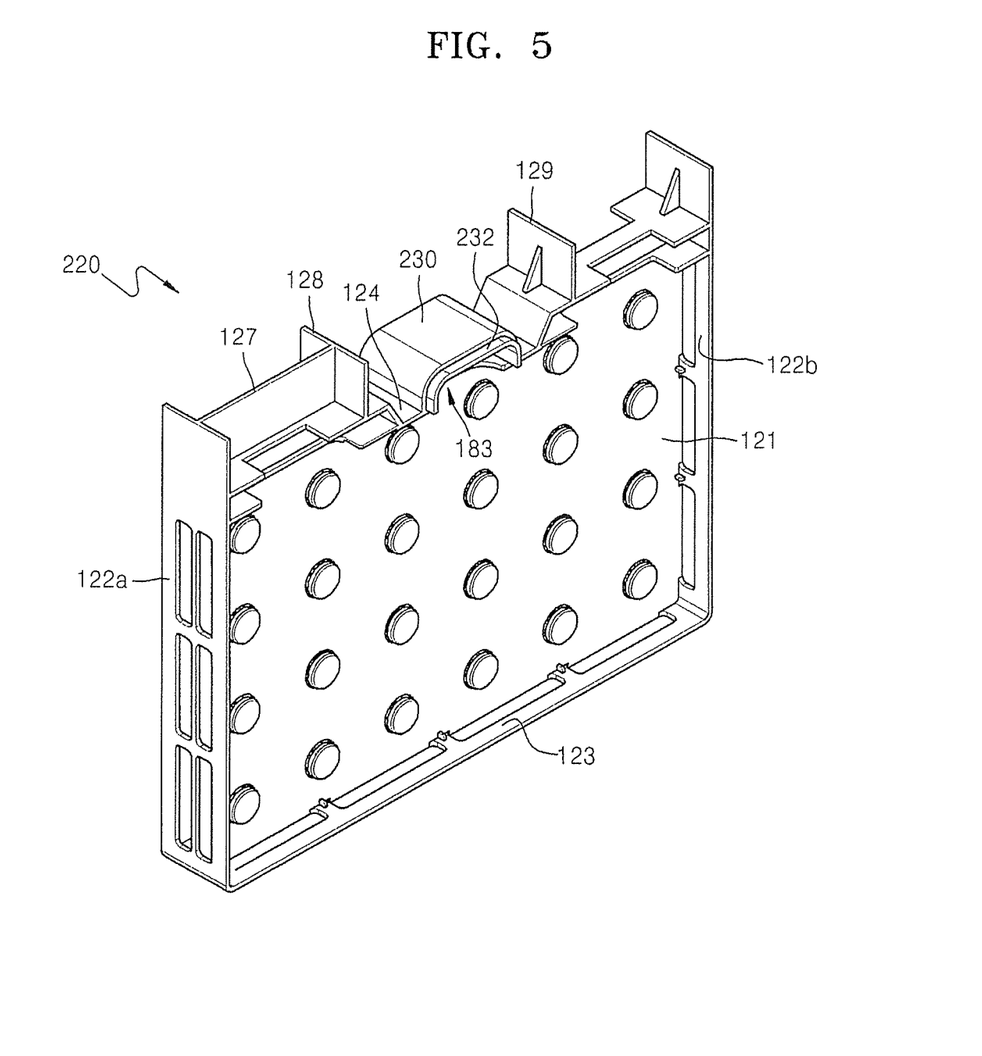
FIG. 5 is a perspective view illustrating a modified example of the spacer of FIG. 1.
Figure 6:
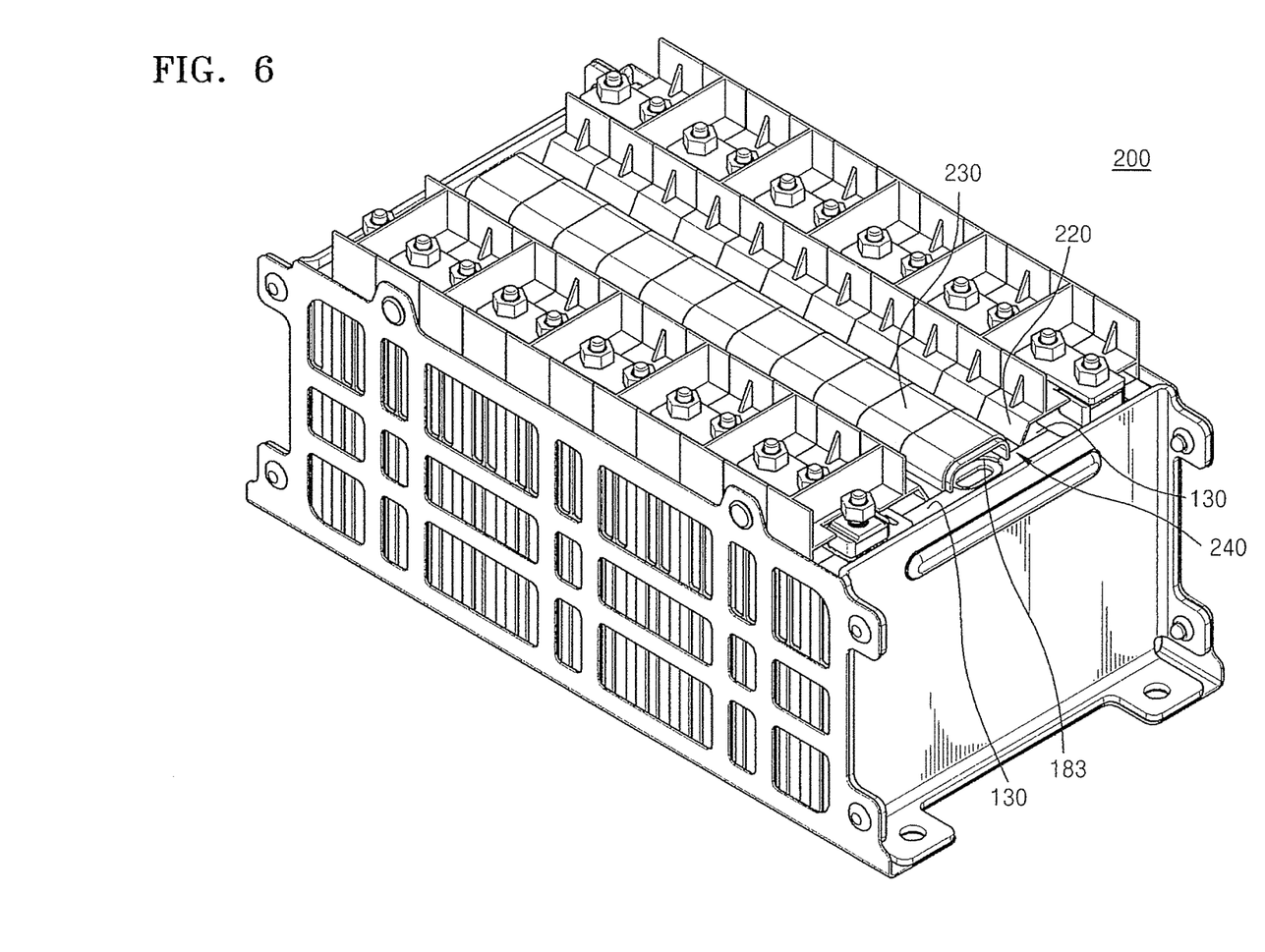
FIG. 6 is a perspective view illustrating a battery module including the spacer of FIG. 5.

FIG. 5 is a perspective view illustrating a modified example of the spacer 120 of FIG. 1. FIG. 6 is a perspective view illustrating a battery module 200 including a spacer 220 of FIG. 5.

Referring to FIGS. 5 and 6, the spacer 220 may include the main body 121, the first wall portion 127 formed as a part of the main body 121 extending upward, and the upper surface 124, the lower surface 123, the first side surface 122a, and the second side surface 122b symmetrically protruding from the front and rear surfaces of the main body 121. Also, the second wall portion 128 and the third wall portion 129 may be parallelly formed on the upper surface 124.

The first and second side surfaces 122a and 122b extend upward to the same height as the first wall portion 127. One end of the first wall portion 127 contacts the first side surface 122a, whereas the other end of the first wall portion 127 contacts the second wall portion 128. Also, the third wall portion 129 is parallel to the second side surface 122b and separated by as much as a length of the first wall portion 127 from the second side surface 122b.

Since the main body 121, the first wall portion 127, the upper surface 124, the lower surface 123, the first side surface 122a, the second side surface 122b, the second wall portion 128, and the third wall portion 129 are the same as those described with reference to FIGS. 2 and 3; descriptions thereof will be omitted here.

The spacer 220 of FIG. 5 further includes an air exhaust passage member 230 covering the vent member exposure portion 183 formed in the upper surface 124. The air exhaust passage member 230 has a structure in which an upper surface thereof is closed so that a gas discharged from the unit cells 130 of FIG. 6 may proceed toward one side direction.

Also, the air exhaust passage member 230 may include a coupling member 232 at one end thereof. The coupling member 232 may have, for example, a protruding portion protruding toward the front surface of the spacer 220 in a form of a step. On the other hand, the coupling member 232 may also have an indented portion at the other end of the air exhaust passage member 230, that is, at the rear surface of the spacer 220. Thus, the protruding portion of the coupling member 232 may be coupled to the indented portion of the neighboring coupling member 232. However, the coupling member 232 is not limited thereto, and a variety of structures may be available therefor.

The spacer 220 including the air exhaust passage member 230 is disposed between the unit cells 130 arranged in a line, as illustrated in FIG. 6. Accordingly, the air exhaust passage member 230 included in each spacer 220 is coupled to the neighboring air exhaust passage member 230, thereby forming an air exhaust pipe 240.

Therefore, since no additional structure for discharging the gas discharged from the unit cells 130 to the outside is needed, efficiency in manufacturing the battery module 200 may be enhanced, the weight of the battery module 200 may be reduced, and manufacturing costs may be reduced.

The battery module according to the present invention is not limited to the above-described structures and methods. Some or all of the embodiments may be selectively combined to make a variety of modifications.

As described above, according to the one or more of the above embodiments of the present invention, an insulation (or an insulation characteristic) between unit cells arranged in a thicknesswise direction of the unit cells (i.e., arranged along a line) may be easily obtained. Also, a separate apparatus for discharging discharge gas generated in the unit cells may be omitted.

It should be understood that the exemplary embodiments described herein should be considered in a descriptive sense only and not for purposes of limitation. Descriptions of features or aspects within each embodiment should typically be considered as available for other similar features or aspects in other embodiments.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
    a first unit cell arranged parallel to a second unit cell, each of the first and second unit cells comprising a first electrode terminal and a second electrode terminal having a polarity opposite to that of the first electrode terminal, the first electrode terminal of the first unit cell being juxtaposed to the second electrode terminal of the second unit cell; and
    a spacer arranged between the first and second unit cells and two adjacent spacers interposed therebetween by the spacer and the first and second unit cells, each of the spacer and the two adjacent spacers comprising a main body, a first side surface, and a second side surface parallel to the first side surface, the side surfaces symmetrically protruding from a front and a rear surface of the main body,
    wherein each of the spacer and the two adjacent spacers further comprises a first wall portion extending upward from the main body, a second wall portion perpendicular to the first wall portion and contacting the first wall portion, and a third wall portion parallel to the second wall portion, the first, second, and third wall portions all having a same height and extending upward from the main body,
    wherein the first and second side surfaces extend upward to the same height as the first wall portion, the first and second side surfaces and the second and third wall portions being parallel, wherein the first wall portion of the spacer is disposed at and between the first electrode terminal of the first unit cell and the second electrode terminal of the second unit cell, the first wall portion having a height greater than a height of the first electrode terminal of the first unit cell, wherein the spacer and the two adjacent spacers are arranged in alternating orientations such that the second side surface and the third wall portion of the spacer cooperate with the first side surface, the first wall portion, and the second wall portion of each of the two adjacent spacers to completely surround a perimeter of the juxtaposed second electrode terminal of the first unit cell and the first electrode terminal of the second unit cell on all four sides at a height greater than a height of each of the second electrode terminal of first unit cell and the first electrode terminal of the second unit cell, and wherein each of the spacer and the two adjacent spacers comprises an air exhaust passage member, the air exhaust passage members of the spacer and the two adjacent spacers are connected to one another to form an air exhaust pipe.

2. The battery module of claim 1, wherein:

each of the spacer and the two adjacent spacers further comprises an upper surface and a lower surface symmetrically protruding from a front surface and a rear surface of the main body of the respective spacer to surround parts of the first and second unit cells; and the first wall portion is disposed on the upper surface of its respective spacer.

3. The battery module of claim 2, wherein each of the spacer and the two adjacent spacers comprises an electrode terminal exposure portion exposing the first and second electrode terminals respectively included in the first and second unit cells to the outside, the electrode terminal exposure portion being formed on the upper surface of its respective spacer.

4. The battery module of claim 2, wherein the first wall portion is perpendicular to the first side surface, and one end of the first wall portion contacts the first side surface.

5. The battery module of claim 4, wherein the third wall portion is separated by as much as a length of the first wall portion from the second side surface, the second and third wall portions being formed on the upper surface of its respective spacer.

6. The battery module of claim 2, wherein each of the first and second unit cells comprises a vent member formed on an upper portion thereof, and each of the spacer and the two adjacent spacers comprises a vent member exposure portion exposing the vent member, the vent member exposure portion being formed on the upper surface of its respective spacer.

7. The battery module of claim 6, wherein the air exhaust passage member covers the vent member exposure portion, the air exhaust passage member being formed on the upper surface of its respective spacer.

8. The battery module of claim 7, wherein the air exhaust passage member comprises a coupling member at one end of the air exhaust passage member facing toward a front or rear surface of its respective spacer.

9. The battery module of claim 2, wherein a hole is formed in each of the first side surface, the second side surface, and the lower surface of each respective spacer.

10. The battery module of claim 1, wherein a plurality of protrusions are formed on a front surface and a rear surface of the main body.

11. The battery module of claim 1, wherein the second electrode terminal of the first unit cell and the first electrode terminal of the second unit cell are connected by a bus bar.

12. The battery module of claim 1, wherein the main body is integrally provided with the first wall portion.

13. A battery module comprising:

a plurality of unit cells alternately arranged such that locations of first and second electrode terminals of one of the unit cells are juxtaposed to second and first electrode terminals of a neighboring one of the unit cells in a thicknesswise direction of the unit cells;

a plurality of spacers arranged between the plurality of unit cells and a pair of spacers interposed therebetween by the plurality of spacers and the plurality of unit cells, each of the plurality of spacers and the pair of spacers comprising a main body, a first side surface, and a second side surface parallel to the first side surface, the side surfaces symmetrically protruding from a front and a rear surface of the main body; and a plurality of bus bars electrically connecting the plurality of unit cells, wherein each of the plurality of spacers and the pair of spacers further comprises a first wall portion extending upward from the main body, a second wall portion perpendicular to the first wall portion and contacting the first wall portion, and a third wall portion parallel to the second wall portion, the first, second, and third wall portions all having a same height and extending upward from the main body, wherein the first and second side surfaces extend upward to the same height as the first wall portion, the first and second side surfaces and the second and third wall portions being parallel, wherein the first wall portion is disposed between two neighboring bus bars of the plurality of bus bars and having a height greater than a height of the first electrode terminal of one of the unit cells, wherein the plurality of spacers and the pair of spacers are arranged in alternating orientations such that the first side surface, the first wall portion, and the second wall portion of each of the pair of spacers cooperate with the second side surface and the third wall portion of one of the plurality of spacers and the first side surface, the first wall portion, and the second wall portion of another one of the plurality of spacers to completely surround a perimeter of an independent bus bar space on all four sides having a height greater than a height of the first and second electrode terminals of the respective unit cells enclosed within the independent bus bar space, and wherein each of the plurality of spacers and the pair of spacers comprises an air exhaust passage member, the air exhaust passage members of the plurality of spacers and the pair of spacers are connected to one another to form an air exhaust pipe.

14. The battery module of claim 13, wherein each of the plurality of spacers further comprises an upper surface and a lower surface symmetrically protruding from a front surface and a rear surface of the main body, the first wall portion is disposed on the upper surface of the spacer, and one end of the first wall portion contacts the first side surface.

15. The battery module of claim 14, wherein the third wall portion of each of the plurality of spacers is separated by as much as a length of the first wall portion from the second side surface, the second and third wall portions being formed on the upper surface of the corresponding spacer.

16. The battery module of claim 15, wherein the heights of the first side surface, the second side surface, the first wall portion, the second wall portion, and the third wall portion are higher than the heights of the first and second electrode terminals.

17. The battery module of claim 14, wherein each of the plurality of spacers comprises:
   a vent member exposure portion; and
   the air exhaust passage member covering the vent member exposure portion,
   the vent member exposure portion and the air exhaust passage member being formed on the upper surface of the corresponding spacer.

18. The battery module of claim 1, wherein the first wall portion further has a height greater than a height of the second electrode terminal of the second unit cell.

19. The battery module of claim 13, wherein the first wall portion further has a height greater than a height of the second electrode terminal of one of the unit cells.

* * * * *